United States Patent
Ro et al.

(10) Patent No.: US 8,619,834 B2
(45) Date of Patent: *Dec. 31, 2013

(54) METHOD AND APPARATUS FOR FREQUENCY ASSIGNMENT IN A FREQUENCY HOPPING MODE OF A WIRELESS COMMUNICATION SYSTEM

(75) Inventors: Sang Min Ro, Seoul (KR); Youn H. Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,615

(22) Filed: Sep. 10, 2012

(65) Prior Publication Data

US 2013/0010832 A1 Jan. 10, 2013

Related U.S. Application Data

(63) Continuation of application No. 12/613,242, filed on Nov. 5, 2009, now Pat. No. 8,265,119.

(30) Foreign Application Priority Data

Dec. 23, 2008 (KR) ........................ 10-2008-0132507

(51) Int. Cl.
*H04B 1/69* (2011.01)
*H04B 1/707* (2011.01)
*H04B 1/713* (2011.01)

(52) U.S. Cl.
USPC ........... 375/132; 375/135; 375/136; 375/260; 375/267; 375/299; 370/330

(58) Field of Classification Search
USPC ......... 375/260, 267, 299, 347, 132, 135, 136; 370/330; 455/500, 101
See application file for complete search history.

(56) References Cited

U.S. PATENT DOCUMENTS

| | | | |
|---|---|---|---|
| 8,265,119 B2 * | 9/2012 | Ro et al. ......................... | 375/132 |
| 2007/0147526 A1 * | 6/2007 | Kim et al. ...................... | 375/260 |
| 2008/0089286 A1 | 4/2008 | Malladi et al. | |
| 2008/0212532 A1 * | 9/2008 | Heo et al. ...................... | 370/330 |
| 2008/0212556 A1 * | 9/2008 | Heo et al. ...................... | 370/344 |
| 2010/0284363 A1 * | 11/2010 | Ahn et al. ...................... | 370/330 |

\* cited by examiner

*Primary Examiner* — Phuong Phu
(74) *Attorney, Agent, or Firm* — The Farrell Law Firm, P.C.

(57) ABSTRACT

A frequency allocation method and apparatus using a mirroring-assisted frequency hopping pattern is provided for retransmission in a wireless communication system operating in a frequency hopping mode. A frequency mapping method for a wireless communication system operating in a frequency hopping mode includes determining whether or not mirroring is used in accordance with a number of packet transmissions; mapping a frequency resource for a packet transmission based on a result of the determination; and receiving a packet using the mapped frequency resource.

20 Claims, 8 Drawing Sheets

METHOD AND APPARATUS FOR FREQUENCY ASSIGNMENT IN A FREQUENCY HOPPING MODE OF A WIRELESS COMMUNICATION SYSTEM

PRIORITY

This application is a Continuation of U.S. application Ser. No. 12/613,242, which was filed in the U.S. Patent and Trademark Office on Nov. 5, 2009, and claims priority under 35 U.S.C. §119(a) to Korean Patent Application Serial No. 2008-0132507, which was filed in the Korean Intellectual Property Office on Dec. 23, 2008, the content of each of which is incorporated herein by reference.

BACKGROUND OF THE INVENTION

1. Field of the Invention

The present invention relates generally to a frequency allocation method of a wireless communication system operating in a frequency hopping mode and an apparatus therefor and, in particular, to a frequency allocation method and apparatus using a mirroring-assisted frequency hopping pattern for retransmission in a wireless communication system operating in a frequency hopping mode.

2. Description of the Related Art

Universal Mobile Telecommunications System (UMTS) is one of the third generation (3G) mobile telecommunication technologies, which has evolved from Global System for Mobile communications (GSM) and General Packet Radio Services (GPRS) and uses Wideband Code Division Multiple Access (WCDMA).

The $3^{rd}$ Generation Partnership Project (3GPP), which is responsible for standardization of UMTS, is working to significantly extend the performance of UMTS in Long Term Evolution (LTE). LTE is a 3GPP standard that provides for a downlink speed of up to 300 Mbps and is expected to be commercially launched in 2010. In order to fulfill the requirements for the LTE systems, studies have been done on various aspects including minimization of a number of involved nodes in connections and placing radio protocol as close as possible to radio channels.

In current wireless communication systems, a mirroring technique is used for achieving frequency diversity gain to improve reception reliability. As a representative example, LTE uses a mirroring technique for uplink transmission in a frequency hopping mode. Particularly, in a Hybrid Automatic Repeat Request (HARQ) process, the LTE supports an inter-subframe frequency hopping with the mirroring technique for every initial transmission and retransmission to improve the reception reliability of retransmitted data.

In the current standard specification, however, the HARQ retransmission is performed in unit of 8 subframes, while a radio frame includes 10 subframes. This difference in the subframes diminishes further randomization of the frequency hopping even when using the mirroring technique, thereby resulting in a reduction of frequency diversity gain.

SUMMARY OF THE INVENTION

In order to solve at least the above-described problems of the prior art, a frequency mapping method for a wireless communication system operating in a frequency hopping mode is provided. The frequency mapping method includes determining whether or not mirroring is used in accordance with a number of packet transmissions; mapping a frequency resource for a packet transmission based on a result of the determination; and receiving a packet using the mapped frequency resource.

Further, a reception apparatus for a wireless communication system operating in a frequency hopping mode is provided, which includes a frequency mapper that determines whether or not mirroring is used in accordance with a number of packet transmissions, and maps a frequency resource for a packet transmission based on a result of the determining; and a communication unit that receives a packet using the mapped frequency resource.

Further, a frequency mapping method for a wireless communication system operating in a frequency hopping mode is provided, which includes determining whether or not mirroring is used in accordance with a number of packet transmissions; mapping a frequency resource for a packet transmission based on a result of the determination; and transmitting a packet using the mapped frequency resource.

Further, a transmission apparatus for a wireless communication system operating in a frequency hopping mode is provided, which includes a frequency mapper that determines whether or not mirroring is used in accordance with a number of packet transmissions, and maps a frequency resource for a packet transmission based on a result of the determining; and a communication unit that transmits a packet using the mapped frequency resource.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

Certain embodiments of the present invention will be described in detail below with reference to the accompanying drawings. The same reference numbers are used throughout the drawings to refer to the same or like parts. Detailed descriptions of well-known functions and structures incorporated herein may be omitted to avoid obscuring the subject matter of the present invention.

The terms and words used in the following description and claims are not limited to the bibliographical meanings, but are merely used by the inventor to enable a clear and consistent understanding of the invention. Accordingly, it should be apparent to those skilled in the art that the following description of the embodiments of the present invention are provided for illustration purpose only and not for the purpose of limiting the invention as should be defined by the appended claims and their equivalents.

The terms used in following description are directed to the glossary specified in the 3GPP LTE standard specification. However, the present invention is not limited thereto, but can be applied to various types of wireless communication systems using a mirroring technique in a HARQ process to achieve diversity gain.

Figure 1:
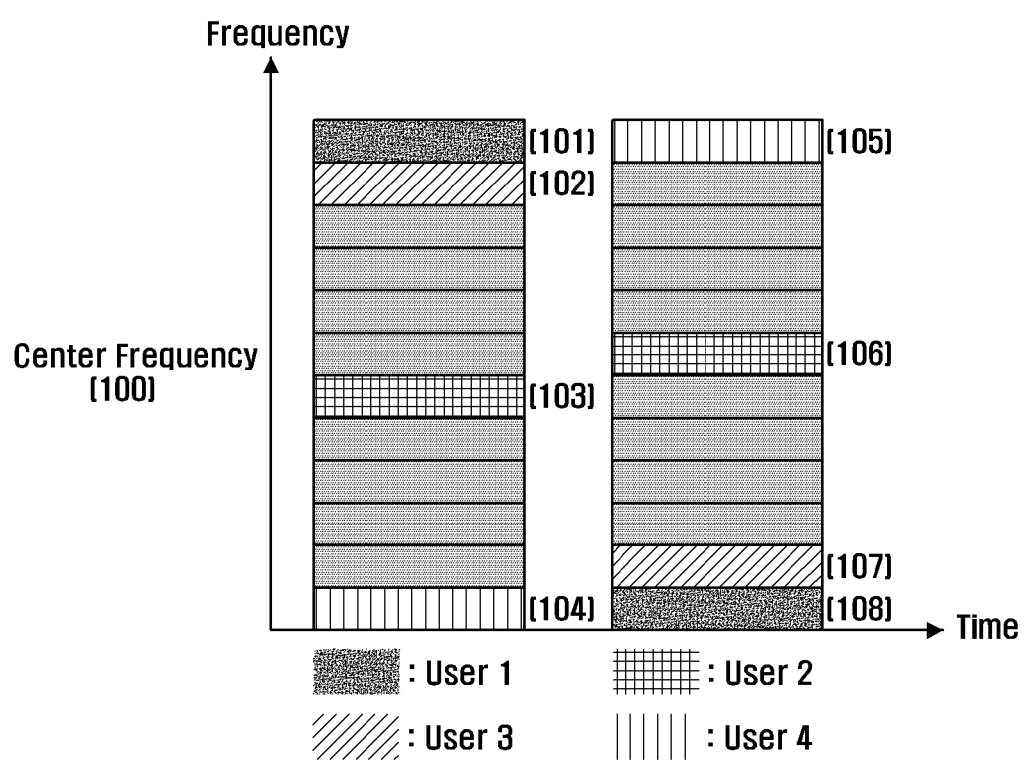
FIG. 1 is a diagram illustrating a principle of frequency hopping using a mirroring technique.

FIG. 1 is a diagram illustrating a principle of frequency hopping using a mirroring technique.

Referring to FIG. 1, four (4) users (user 1, user 2, user 3, and user 4) are allocated frequency resources on a Physical Uplink Shared Channel (PUSCH) and the frequency resources are mirrored to achieve the frequency hopping. User 1 is allocated a frequency resource 101 for an initial transmission and a frequency resource 108 for a next transmission. The frequency resources 101 and 108 are symmetric with each in position from a point of reference of a center frequency 100.

In similar manner, user 2 is allocated frequency resources 102 and 107, user 3 is allocated frequency resources 103 and 106, and user 4 is allocated frequency resources 104 and 105, for their initial and next transmissions. Again, the frequency resources for the initial and next transmissions are symmetric from a reference point of the center frequency 100. The mirroring technique switches the frequency resources symmetrically from the point of reference of the center frequency to achieve the frequency hopping. The transmission data unit can be a frame, a subframe, or a slot depending on the system configuration.

Figure 2:
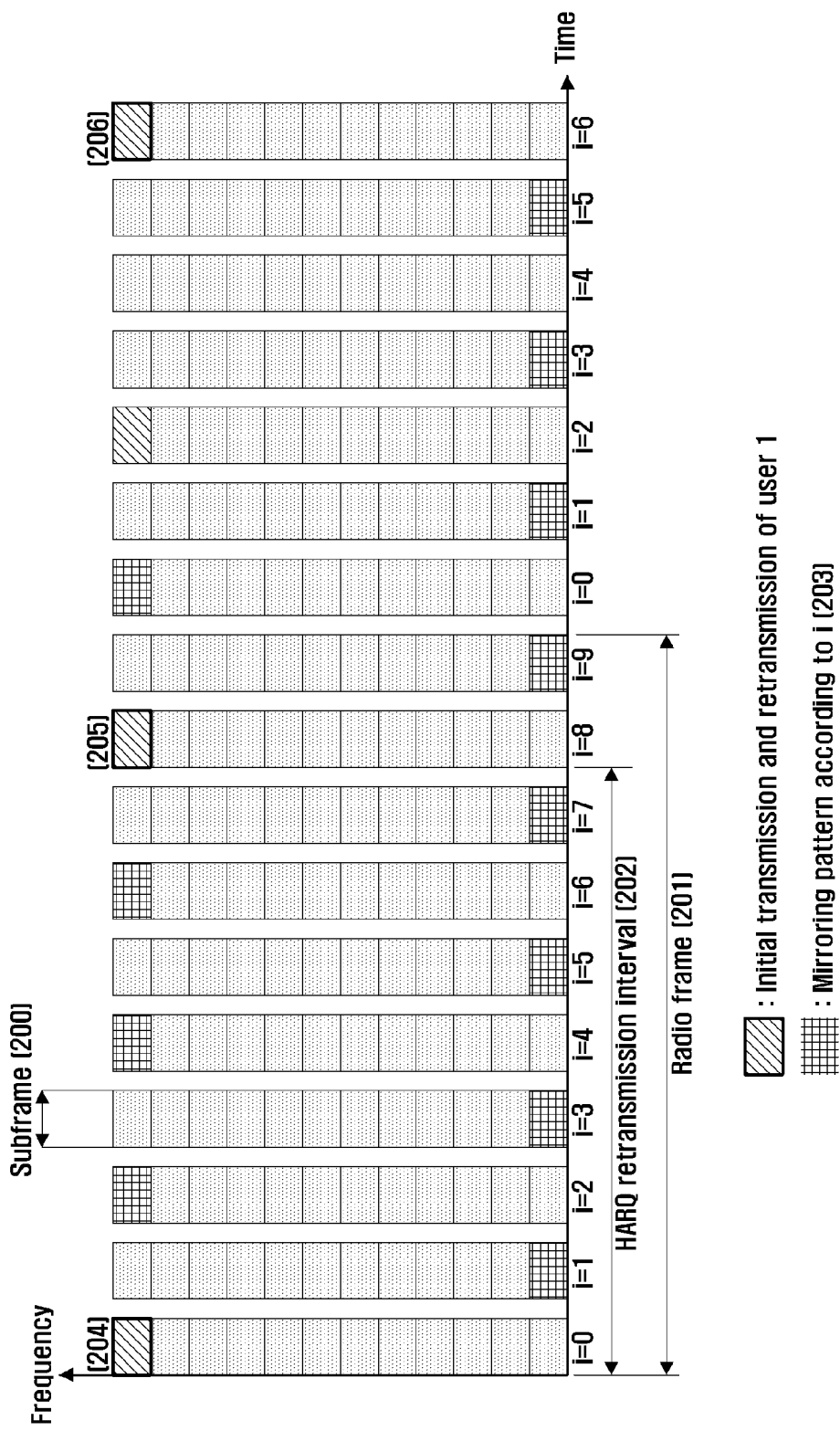
FIG. 2 is a diagram illustrating a principle of a mirroring technique in a HARQ process.

FIG. 2 is a diagram illustrating a principle of a mirroring technique in a HARQ process.

In an LTE system as illustrated in FIG. 2, each user transmits a transmission packet in a unit of a subframe 200, where a radio frame includes 10 subframes. In the specification of the LTE standard, HARQ retransmission is configured to be made in an interval of 8 subframes 202 for an uplink data transmission. Also, the LTE standard specifies a frequency hopping mode adopting the mirroring technique in a unit of a subframe. Mirroring is determined using Equation (1):

$$f_m(i) = i \bmod 2, \qquad (1)$$

In Equation (1), i is a subframe index in a radio frame and has a value in the range from 0 to 9, and $f_m(i)$ is a mirroring on/off pattern of an $i^{th}$ subframe. That is, if $f_m(i)$ is 0, the mirroring is off for all the users in frequency hopping transmission mode; and otherwise, if $f_m(i)$ is 1, the mirroring is on. Reference numeral 203 denotes a frequency hopping with mirroring, and the mirroring-added frequency hopping is performed ever two subframes. The mirroring pattern is changed in position from the point of reference of the center frequency.

From the viewpoint of user 2 in FIG. 2, however, the frequency resource allocated for the retransmissions 205 and 206 are identical to that allocated for the initial transmission 204. Accordingly, the users cannot achieve the frequency diversity gains in the HARQ processes through the frequency hopping, even when using the mirroring technique.

Figure 3:
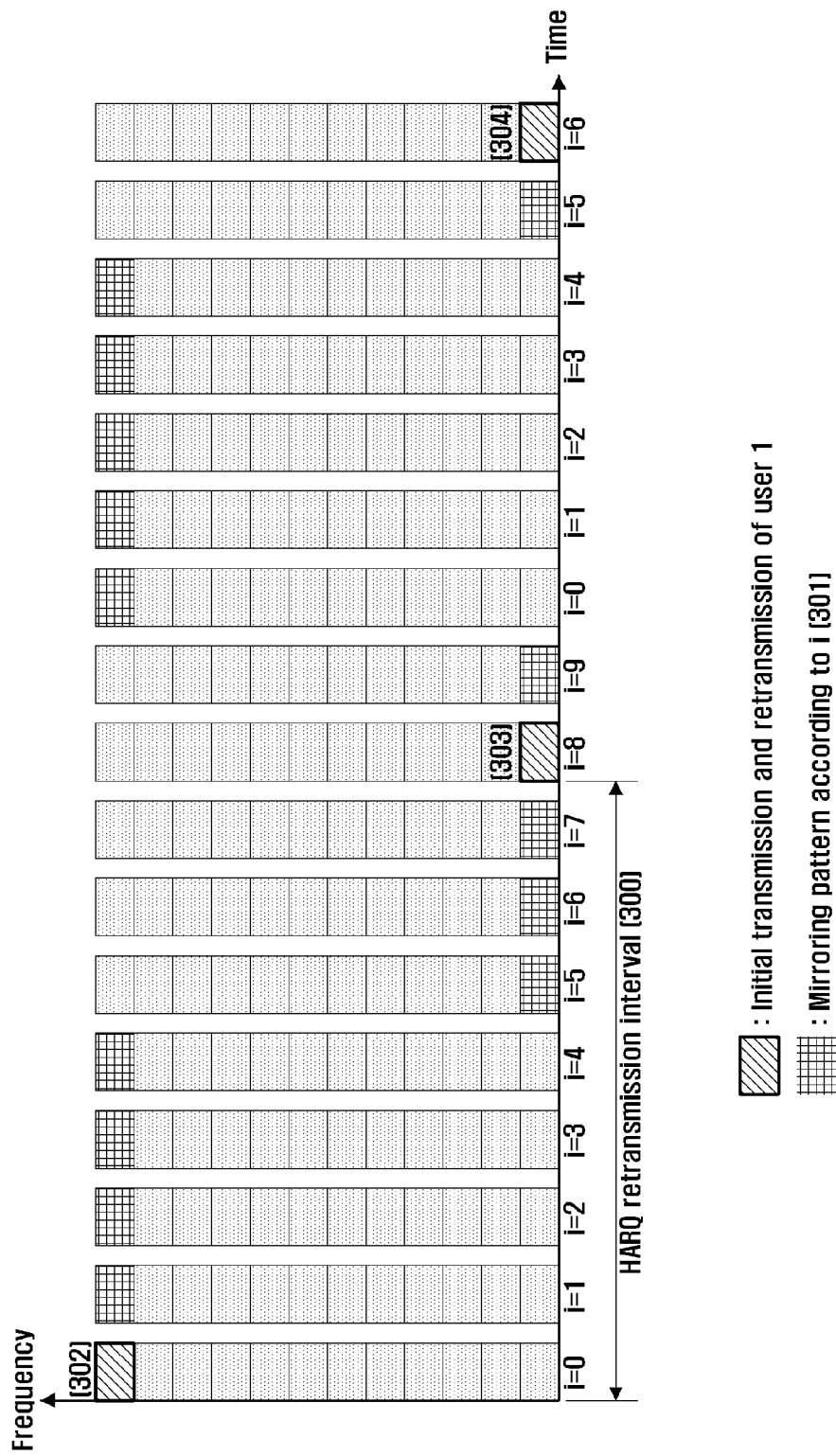
FIG. 3 is a diagram illustrating a principle of a mirroring technique in a HARQ process according to an embodiment of the present invention.

FIG. 3 is a diagram illustrating a principle of a mirroring technique in a HARQ process according to an embodiment of the present invention.

Referring to FIG. 3, it is assumed that a maximum number of transmissions including an initial transmission and HARQ retransmissions is 5, and the mirroring pattern is defined by $f_m(i)$, as shown below in Equation (2). In Equation (2), $f_m(i)$ is a mirroring on/off pattern. Accordingly, if $f_m(i)$ is 0, mirroring is off and, otherwise, if $f_m(i)$ is, mirroring is on.

$$f_m(i) = \lfloor i/5 \rfloor \bmod 2 \qquad (2)$$

In Equation (2), $\lfloor i/5 \rfloor$ is a round-down of i/5 ($\lfloor i/5 \rfloor$ is a natural value).

From the mirroring pattern as denoted by reference numeral 301, it is known that the frequency hopping with mirroring occurs in a unit of 5 subframes. Accordingly, user 1 is allocated frequency 302 for an initial transmission and another frequency for first and second retransmissions 304 and 304, respectively, thereby achieving the frequency diversity, and overcoming one of the problems of the prior art.

The mirroring pattern represented by Equation (2) can be generalized by Equation (3):

$$f_m(i) = \lfloor i/G \rfloor \bmod 2 \qquad (3)$$

In Equation (3), G denotes a frequency hopping interval with mirroring and is an integer value adjustable in consideration of the length of a radio frame and HARQ retransmission interval, $\lfloor i/G \rfloor$ denotes a round-down of i/G and is a natural value. Here, G has a value greater than two subframes and equal to or less than the HARQ retransmission.

Figure 4:
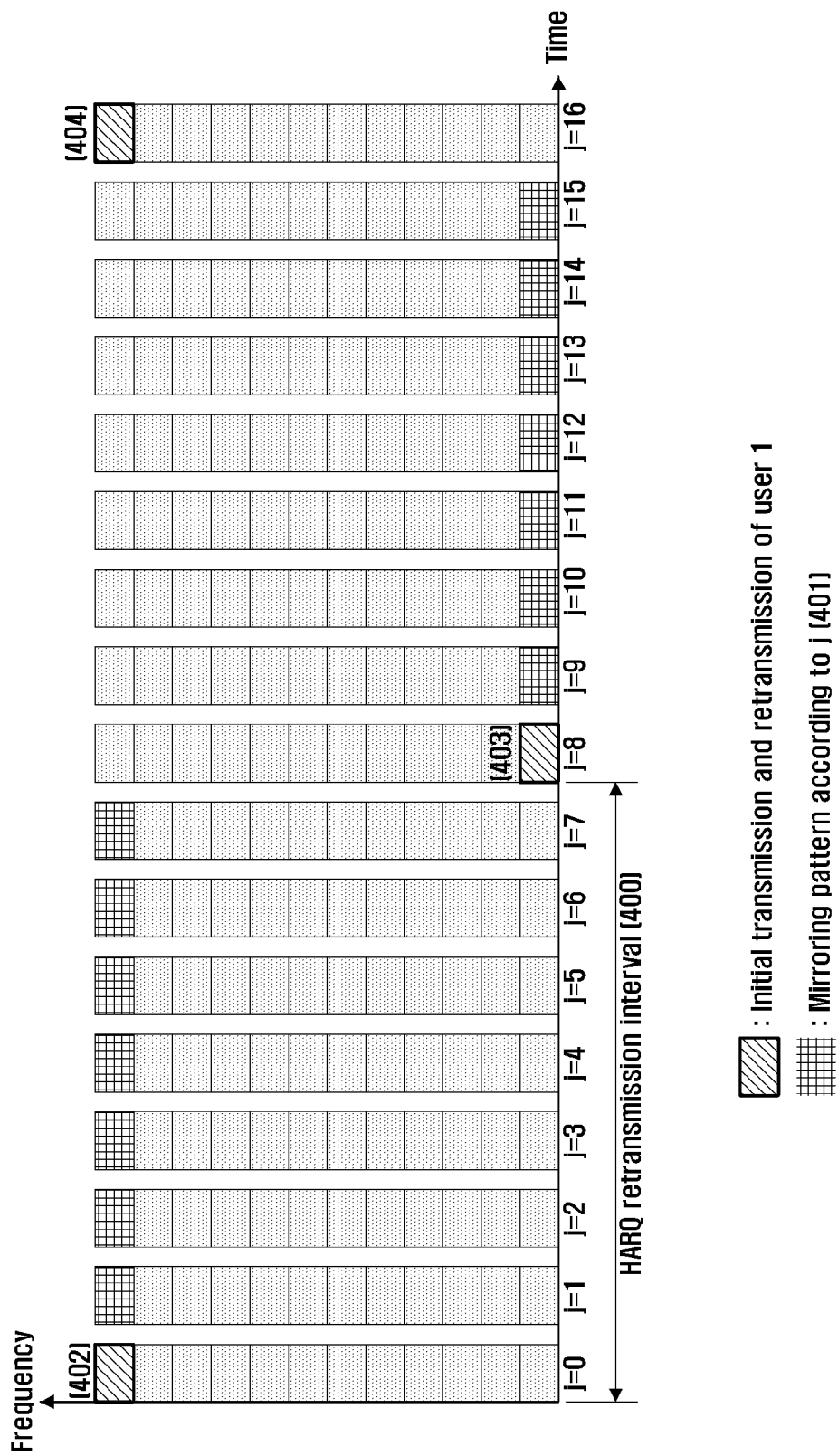
FIG. 4 is a diagram illustrating a principle of a mirroring technique in a HARQ process according to an embodiment of the present invention.

FIG. 4 is a diagram illustrating a principle of a mirroring technique in a HARQ process according to another embodiment of the present invention.

Referring to FIG. 4, a parameter j=10k+1 indicating the $i^{th}$ subframe index in the $k^{th}$ radio frame is newly defined by extending the definition on the subframe index i in the radio frame. With this new parameter, the mirroring pattern $f_m(i)$ can be written as shown in Equation (4):

$$f_m(j) = \lfloor j/8 \rfloor \bmod 2 (j=10k+i) \qquad (4)$$

In Equation (4), $\lfloor j/8 \rfloor$ denotes a round-down value of j/8 ($\lfloor j/8 \rfloor$ is a natural value).

In FIG. 4, the frequency hopping interval with mirroring is 8 subframes, such that the mirroring is performed in a unit of 8 subframes that is identical to the HARQ retransmission interval. Accordingly, the initial transmission 402 and first and second HARQ retransmissions 403 and 404 of user 1 are made on the two frequency bands alternately, whereby respective users can achieve the frequency diversity with the mirroring, which is consistent with retransmission timing. The mirroring pattern represented by Equation (4) can be generalized with the HARQ retransmission interval of M subframes as shown in Equation (5)

$$f_m(j) = \lfloor j/M \rfloor \bmod 2 (j=10k+j) \qquad (5)$$

In Equation (5), $\lfloor j/M \rfloor$ mod 2 denotes a round-down value of j/M ($\lfloor j/M \rfloor$ is a natural value).

Figure 5:
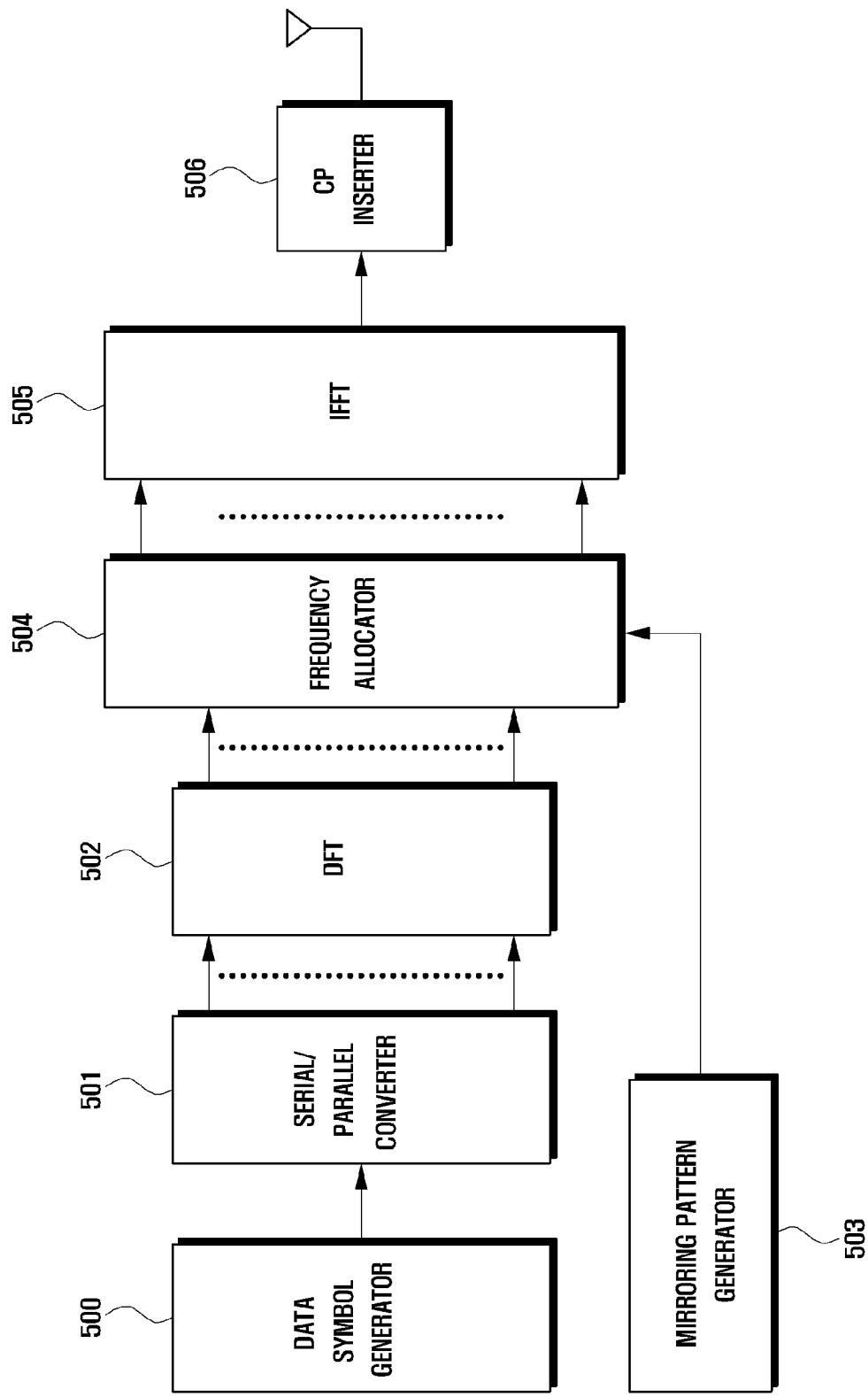
FIG. 5 is a block diagram illustrating a transmission apparatus according to an embodiment of the present invention.

FIG. 5 is a block diagram illustrating a transmission apparatus according to an embodiment of the present invention.

Referring to FIG. 5, the transmission apparatus, e.g., a mobile terminal, includes a data symbol generator 500, a serial/parallel converter 501, a Discrete Fourier Transformer (DFT) 502, a mirroring pattern generator 503, a frequency allocator 504, an Inverse Fast Fourier Transformer (IFFT) 505, and a Cyclic Prefix (CP) inserter 506.

The data symbol generator 500 outputs a data symbol stream to the serial/parallel converter 501, and the serial/parallel converter 501 outputs the data symbols to the DFT 502 in parallel. The DFT 502 transforms the parallel input data symbols in a frequency domain and outputs the transformed signals to the frequency allocator 504.

The frequency allocator 504 allocates frequency bands to the transformed frequency domain representative signals according to a cell-specific mirroring pattern in the entire system bandwidth. The frequency allocator 504 outputs the signals to the IFFT 505, and the IFFT 505 transforms the signals inversely in a time domain and outputs the inversely transformed signal to the CP inserter 506. The CP inserter 506 inserts a CP in to the signal and transmits the CP-inserted signal to a reception apparatus, e.g., a base station.

Figure 6:
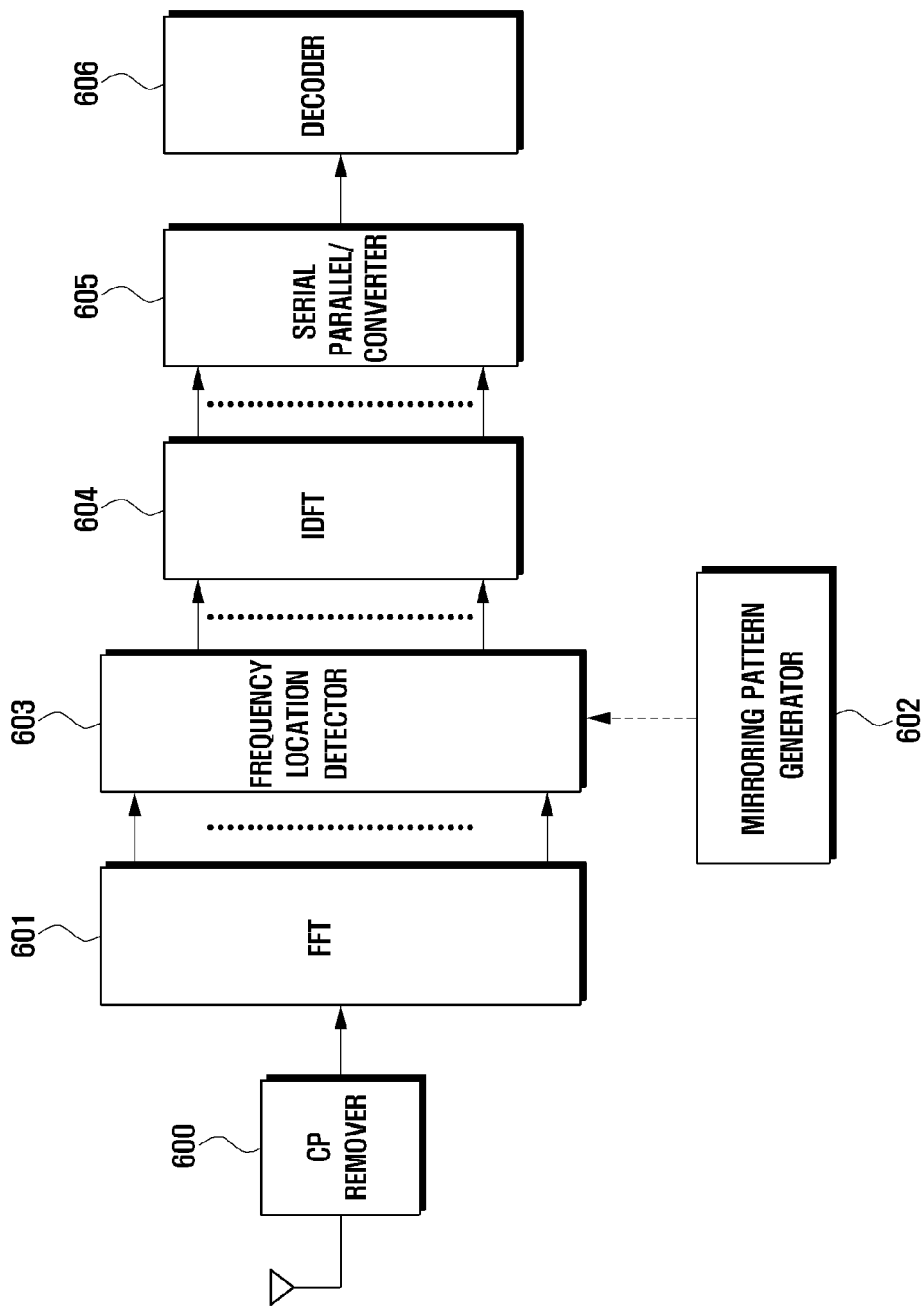
FIG. 6 is a block diagram illustrating a reception apparatus according to an embodiment of the present invention.

FIG. 6 is a block diagram illustrating a reception apparatus according to an embodiment of the present invention.

Referring to FIG. 6, the reception apparatus, e.g., a base station, includes a CP remover 600, a Fast Fourier Transformer (FFT) 601, a mirroring pattern generator 602, a frequency location detector 603, an inverse Discrete Fourier Transformer (IDFT) 604, a parallel/serial converter 605, and a decoder 606.

When an uplink signal is received at the reception apparatus, the CP remover 600 removes the CP from the received signal and outputs the CP-removed signal to the FFT 601. The FFT 601 transforms the signal in a frequency domain and outputs the transformed signals to the frequency location detector 603.

The mirroring pattern generator 602 generates a mirroring pattern that is identical to the mirroring pattern generated at the mirroring pattern generator 503 of the transmitter and provides the mirroring pattern to the frequency location detector 603. The frequency location detector 603 detects the frequency locations of the respective users within the system bandwidth with reference to the mirroring pattern provided by the mirroring pattern generator 602.

The IDFT 604 transforms the signals transmitted by the respective users inversely in a time domain and outputs the inversely Fourier-transformed signals to the parallel/serial converter 605 in parallel. The parallel/serial converter 605 converts the parallel signals into serial serials. Finally, the decoder 606 decodes the signals output by the parallel/serial converter 605 in series to recover the transmitted data.

Figure 7:
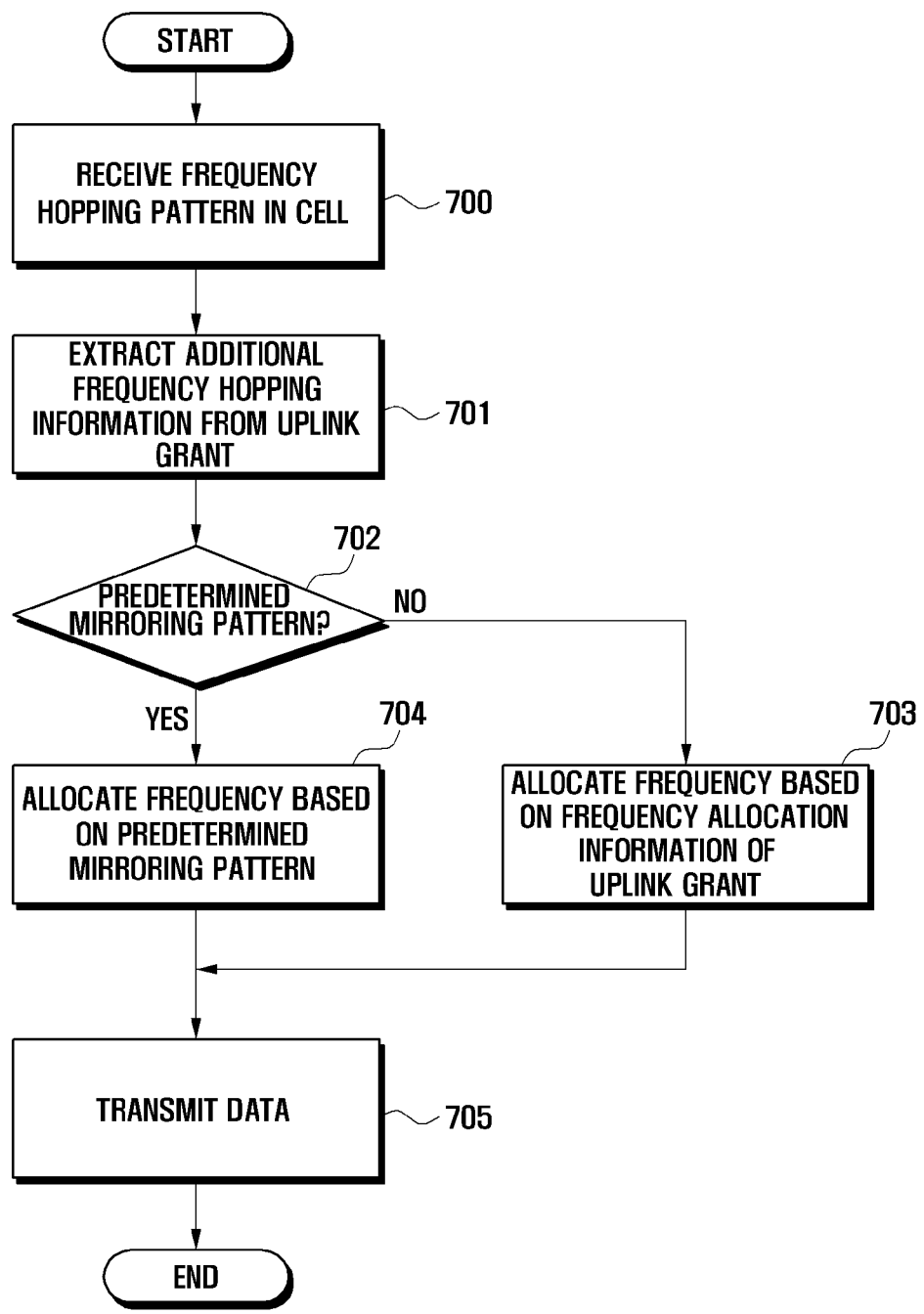
FIG. 7 is a flowchart illustrating a signal transmission method according to an embodiment of the present invention.

FIG. 7 is a flowchart illustrating a signal transmission method according to an embodiment of the present invention.

Referring to FIG. 7, a mobile terminal receives frequency hopping information broadcast by a base station within a cell in step 700. From the cell-specific frequency hopping information, the mobile terminal detects whether the frequency hopping is an intra-subframe frequency hopping or an inter-subframe frequency hopping. In step 701, the mobile terminal extracts user-specific frequency hopping information from an uplink grant transmitted by the base station and determines, based on the user-specific frequency hopping information, whether the user-specific frequency hopping follows a predetermined mirroring pattern in step 702. Here, the predetermined mirroring pattern is a mirroring pattern as described above with reference to FIG. 3 or 4. If the user-specific frequency hopping pattern does not follow the predetermined mirroring pattern, the mobile terminal performs the frequency hopping based on the frequency hopping information extracted from the uplink grant in step 703.

However, if the user-specific frequency hopping pattern follows the predetermined mirroring pattern, the mobile terminal performs the frequency hopping based on the mirroring pattern in step 704. In step 705, the mobile terminal transmits data through the frequency band allocated at step 703 or 704.

Figure 8:
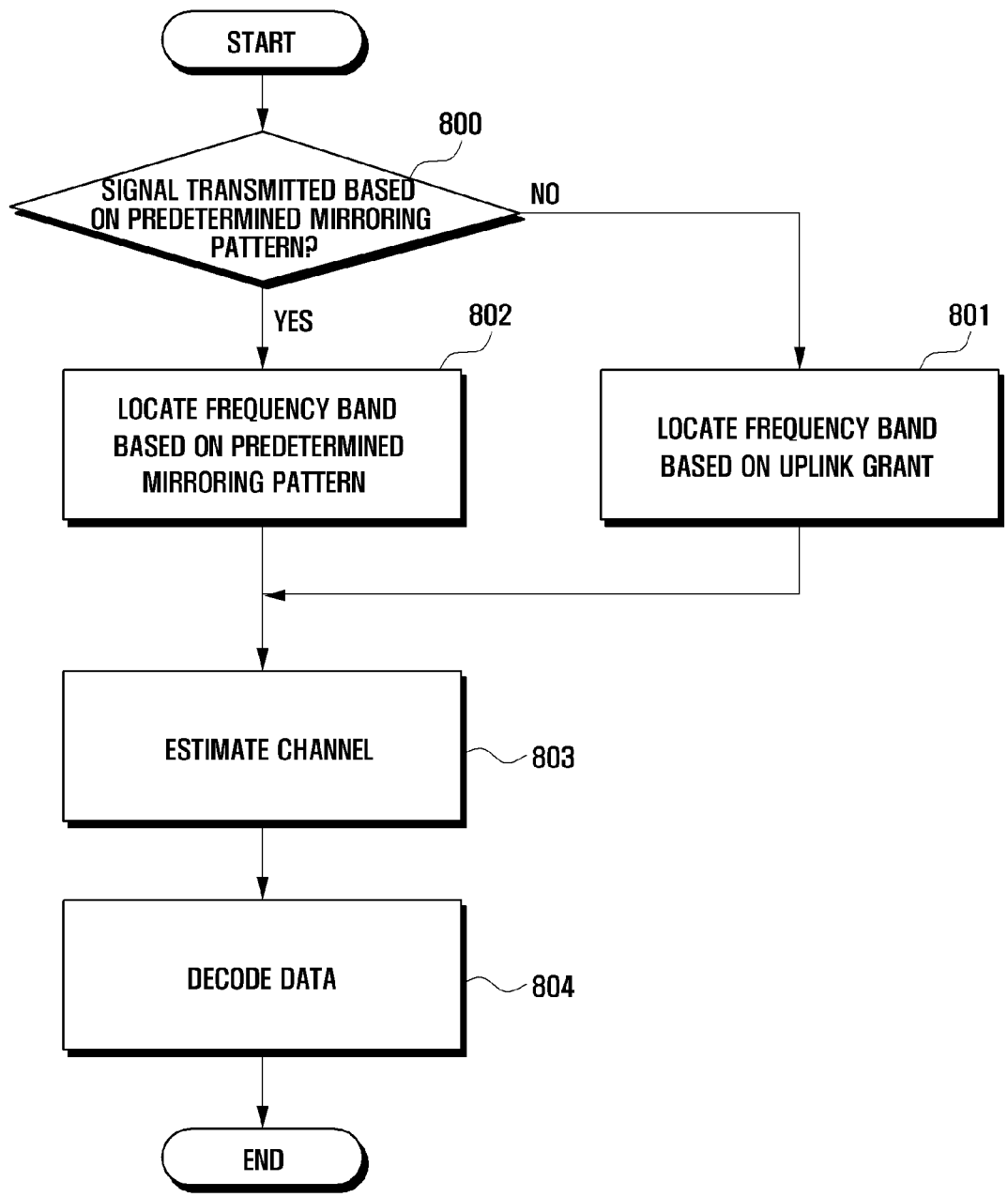
FIG. 8 is a flowchart illustrating a signal reception method according to an embodiment of the present invention.

FIG. 8 is a flowchart illustrating a signal reception method according to an embodiment of the present invention.

Referring to FIG. 8, a base station determines whether a received signal from a mobile terminal is transmitted according to a mirroring pattern predefined between the base station and the mobile terminal in step 800. If the signal is not transmitted according to the predefined mirroring pattern, the base station locates the frequency band allocated to the mobile terminal for the data transmission based on the frequency allocation information of the uplink grant that is transmitted from the base station to the mobile terminal in step 801.

However, if the signal is transmitted according to the predefined mirroring pattern, the base station locates the frequency band allocated to the mobile terminal for the data transmission with reference to the predefined mirroring pattern in step 802. In step 803, the base station performs channel estimation to the data received through the frequency bands corresponding to respective mobile terminals detected at step 802 and then decodes the data transmitted by the respective mobile station using the estimated channel values in step 804.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

What is claimed is:

1. A frequency mapping method for a wireless communication system operating in a frequency hopping mode, comprising:
   determining, by a frequency mapper, whether or not mirroring is used in accordance with a number of packet transmissions;
   mapping, by the frequency mapper, a frequency resource for a packet transmission based on a result of the determination; and
   receiving, by a communication unit, a packet using the mapped frequency resource.

2. The frequency mapping method of claim 1, determining whether or not mirroring is used comprises determining whether or not mirroring is used alternately in accordance with the number of packet transmissions.

3. The frequency mapping method of claim 1, wherein whether or not mirroring is used is determined by $f_m(j)$, and for an $i^{th}$ subframe of a $k^{th}$ radio frame $f_m(j)$ is defined by:

$$f_m(j) = \lfloor j/M \rfloor \bmod 2,$$

where $j = p*k+i$, p is a number of subframes of a radio frame, and M is a data retransmission interval measured in number of subframes.

4. The frequency mapping method of claim 3, wherein mapping the frequency resource for the packet transmission comprises:
   mapping the frequency resource for the $i^{th}$ subframe of the $k^{th}$ radio frame using mirroring, if $f_m(j)$ is 1; and
   mapping the frequency resource for the $i^{th}$ subframe of the $k^{th}$ radio frame without using mirroring, if $f_m(j)$ is 0.

5. The frequency mapping method of claim 3, wherein p is 10 and M is 8.

6. A reception apparatus for a wireless communication system operating in a frequency hopping mode, comprising:
   a frequency mapper that determines whether or not mirroring is used in accordance with a number of packet transmissions, and maps a frequency resource for a packet transmission based on a result of the determining; and
   a communication unit that receives a packet using the mapped frequency resource.

7. The reception apparatus of claim 6, wherein the frequency mapper determines whether or not mirroring is used alternately in accordance with the number of packet transmissions.

8. The reception apparatus of claim 6, wherein whether or not mirroring is used is determined by $f_m(j)$, and for an $i^{th}$ subframe of a $k^{th}$ radio frame $f_m(j)$ is defined by:

$$f_m(j)=\lfloor j/M \rfloor \bmod 2,$$

where j=p*k+i, p is a number of subframes of a radio frame, and M is a data retransmission interval measured in number of subframes.

9. The reception apparatus of claim 8, wherein the frequency mapper maps the frequency resource for the $i^{th}$ subframe of the $k^{th}$ radio frame using mirroring, if $f_m(j)$ is 1, and maps the frequency resource for the $i^{th}$ subframe of the $k^{th}$ radio frame without using mirroring, if $f_m(j)$ is 0.

10. The reception apparatus of claim 8, wherein p is 10 and M is 8.

11. A frequency mapping method for a wireless communication system operating in a frequency hopping mode, comprising:
determining, by a frequency mapper, whether or not mirroring is used in accordance with a number of packet transmissions;
mapping, by the frequency mapper, a frequency resource for a packet transmission based on a result of the determination; and
transmitting, by a communication unit, a packet using the mapped frequency resource.

12. The frequency mapping method of claim 11, determining whether or not mirroring is used comprises determining whether or not mirroring is used alternately in accordance with the number of packet transmissions.

13. The frequency mapping method of claim 11, wherein whether or not mirroring is used is determined by $f_m(j)$, and for an $i^{th}$ subframe of a $k^{th}$ radio frame $f_m(j)$ is defined by:

$$f_m(j)=\lfloor j/M \rfloor \bmod 2,$$

where j=p*k+i, p is a number of subframes of a radio frame, and M is a data retransmission interval measured in number of subframes.

14. The frequency mapping method of claim 13, wherein mapping the frequency resource for the packet transmission comprises:
mapping the frequency resource for the $i^{th}$ subframe of the $k^{th}$ radio frame using mirroring, if $f_m(j)$ is 1; and
mapping the frequency resource for the $i^{th}$ subframe of the $k^{th}$ radio frame without using mirroring, if $f_m(j)$ is 0.

15. The frequency mapping method of claim 13, wherein p is 10 and M is 8.

16. A transmission apparatus for a wireless communication system operating in a frequency hopping mode, comprising:
a frequency mapper that determines whether or not mirroring is used in accordance with a number of packet transmissions, and maps a frequency resource for a packet transmission based on a result of the determining; and
a communication unit that transmits a packet using the mapped frequency resource.

17. The reception apparatus of claim 16, wherein the frequency mapper determines whether or not mirroring is used alternately in accordance with the number of packet transmissions.

18. The transmission apparatus of claim 16, wherein whether or not mirroring is used is determined by $f_m(j)$, and for an $i^{th}$ subframe of a $k^{th}$ radio frame $f_m(j)$ is defined by:

$$f_m(j)=\lfloor j/M \rfloor \bmod 2,$$

where j=p*k+i, p is a number of subframes of a radio frame, and M is a data retransmission interval measured in number of subframes.

19. The transmission apparatus of claim 18, wherein the frequency mapper maps the frequency resource for the $i^{th}$ subframe of the $k^{th}$ radio frame using mirroring, if $f_m(j)$ is 1, and maps the frequency resource for the $i^{th}$ subframe of the $k^{th}$ radio frame without using mirroring, if $f_m(j)$ is 0.

20. The transmission apparatus of claim 18, wherein p is 10 and M is 8.

* * * * *